US011148775B2

(12) United States Patent
Kuehmichel

(10) Patent No.: US 11,148,775 B2
(45) Date of Patent: Oct. 19, 2021

(54) WATERCRAFT AND ASSOCIATED PEDAL DRIVE SYSTEM

(71) Applicant: Blaine G. Kuehmichel, Wausau, WI (US)

(72) Inventor: Blaine G. Kuehmichel, Wausau, WI (US)

(73) Assignee: Johnson Outdoors Inc., Racine, WI (US)

( * ) Notice: Subject to any disclaimer, the term of this patent is extended or adjusted under 35 U.S.C. 154(b) by 37 days.

(21) Appl. No.: 16/552,848

(22) Filed: Aug. 27, 2019

(65) Prior Publication Data
US 2021/0061429 A1 Mar. 4, 2021

(51) Int. Cl.
*B63H 16/20* (2006.01)
*B63H 21/17* (2006.01)
*B60L 50/20* (2019.01)
*B63H 23/30* (2006.01)
*B63B 34/20* (2020.01)
*B63B 34/26* (2020.01)
*B63H 23/04* (2006.01)
*B63H 5/125* (2006.01)

(52) U.S. Cl.
CPC .............. *B63H 16/20* (2013.01); *B60L 50/20* (2019.02); *B63B 34/20* (2020.02); *B63B 34/26* (2020.02); *B63H 5/125* (2013.01); *B63H 21/17* (2013.01); *B63H 23/04* (2013.01); *B63H 23/30* (2013.01); *B60L 2200/32* (2013.01); *B63H 2016/202* (2013.01)

(58) Field of Classification Search
CPC ........ B63H 16/12; B63H 16/14; B63H 16/18; B63H 2016/185; B63H 16/20; B63H 2016/202; B63H 5/125; B63H 2005/075; B63H 21/17; B63H 2021/171; B63H 21/20; B63H 23/04; B63H 23/10; B63H 23/30; B63B 34/20; B63B 34/26; B60L 50/20; B60L 2200/32; B60L 2240/421; B60L 2240/423; B60L 2250/12
See application file for complete search history.

(56) References Cited

U.S. PATENT DOCUMENTS

| | | | |
|---|---|---|---|
| 1,121,955 A | 12/1914 | Tracy | |
| 5,938,489 A | 8/1999 | McNeil | |
| 6,171,157 B1 | 1/2001 | Knapp | |
| 6,210,242 B1 * | 4/2001 | Howard | B63B 1/042 440/21 |
| 6,855,016 B1 | 2/2005 | Jansen | |
| 7,021,978 B2 | 4/2006 | Jansen | |
| 7,530,867 B2 | 5/2009 | Jackson | |

(Continued)

FOREIGN PATENT DOCUMENTS

| | | |
|---|---|---|
| EP | 2666708 | 11/2013 |
| WO | WO 2012/094686 | 7/2012 |
| WO | WO 2019/016419 | 1/2019 |

*Primary Examiner* — Ajay Vasudeva
(74) *Attorney, Agent, or Firm* — Reinhart Boerner Van Deuren P.C.

(57) ABSTRACT

A watercraft and associated pedal drive system are provided. The pedal drive system allows for unassisted manual pedaling to provide thrust to the watercraft. The pedal drive system also provides on demand pedal assistance of varying levels via an assist drive train having an electric motor to supplement the manual pedal force input provided by a user at the pedals of pedal drive system.

31 Claims, 9 Drawing Sheets

(56) References Cited

U.S. PATENT DOCUMENTS

| | | |
|---|---|---|
| 7,549,902 B2 | 6/2009 | Jansen |
| 8,342,897 B2 | 1/2013 | Gater et al. |
| 8,529,306 B2 | 9/2013 | Baldwin |
| 8,753,156 B2 | 6/2014 | Ketterman et al. |
| 9,248,897 B2 | 2/2016 | Shields |
| 9,290,233 B2 | 3/2016 | Goin |
| 9,302,755 B2 | 4/2016 | Wolfe |
| 9,359,056 B2 | 6/2016 | Lyons |
| 9,428,255 B2 | 8/2016 | Santa Catarina |
| 9,463,857 B1 | 10/2016 | Schiller et al. |
| 9,475,559 B2 | 10/2016 | Czarnowski et al. |
| 9,623,944 B2 | 4/2017 | Kuehmichel et al. |
| 9,701,367 B2 | 7/2017 | McDonough et al. |
| 9,725,149 B2 | 8/2017 | Kiffmeyer et al. |
| 9,731,802 B2 | 8/2017 | Ketterman et al. |
| 9,738,362 B2 | 8/2017 | Ketterman et al. |
| 9,758,220 B1 | 9/2017 | Zimmerman et al. |
| 9,834,285 B2 | 12/2017 | Orenes Lopez |
| 9,914,519 B2 | 3/2018 | Nutz et al. |
| 9,981,726 B2 | 5/2018 | Ketterman et al. |
| 9,981,727 B2 | 5/2018 | Shields |
| 9,988,133 B2 | 6/2018 | Murphy |
| 10,005,531 B1 | 6/2018 | Broadway et al. |
| 10,124,873 B2 | 11/2018 | Aguirre |
| 10,150,544 B2 | 12/2018 | Schibli |
| 10,458,788 B2 * | 10/2019 | Fyfe ..................... G01B 21/32 |
| 10,538,301 B2 * | 1/2020 | Murphy ................. B63H 16/20 |
| 2002/0142679 A1 | 10/2002 | Ibata et al. |
| 2002/0195039 A1 | 12/2002 | Anderson |
| 2008/0200079 A1 | 8/2008 | Jansen |
| 2012/0238159 A1 | 9/2012 | Palvoelgyi et al. |
| 2018/0265179 A1 | 9/2018 | Shields |
| 2021/0107603 A1 * | 4/2021 | Howard-Willis ...... B63H 23/34 |
| 2021/0229790 A1 * | 7/2021 | Cloutier ................ B63H 21/20 |

* cited by examiner

WATERCRAFT AND ASSOCIATED PEDAL DRIVE SYSTEM

FIELD OF THE INVENTION

This invention generally relates to marine technology, and more particularly watercraft, and even more particularly to pedal drives used in watercraft applications.

BACKGROUND OF THE INVENTION

Recreational watercraft such as kayaks have become increasingly popular for recreational activities. Kayakers have typically used a paddle to propel the kayaks. Unfortunately, many people cannot paddle a kayak for long distances or at all due to various physical conditions. Further, currents in the water, wakes from other watercraft, etc., can make paddling a challenging process even for the fit enthusiast.

Further, if a person is using the kayak to fish, paddling becomes a limitation of the kayak as the kayaker typically must use both hands to paddle the kayak and thus cannot hold the fishing pole or operate any fishing related equipment. It has become very popular to fish from kayaks as a kayak can be maneuvered into many areas that a typical boat for fishing cannot. Due to the benefits of the maneuverability of the kayak many fishermen who would not otherwise use a kayak have become drawn to their use. Some of these fishermen would prefer a method to reduce the amount of paddling required to get to and from their fishing spot, but do not want to lose the shallow water capabilities of a traditional kayak.

In view of the above, there has been a trend in recent years to utilize additional componentry on the kayak to avoid the need for paddling the kayak, or at least reduce the amount of paddling necessary. An example of such componentry is the use of pedal drives in the context of kayaks and the like. Such pedal drives can take on a variety of forms. For example, such pedal drives may operate as a traditional bicycle type pedal, or as a more customized configuration where pedaling is essentially a linear motion. In either case, the pedaling force provided is mechanically converted to an output at a propeller or similar device used to provide thrust to the kayak in the water. Such configurations advantageously remove the necessity to hold a paddle.

Despite the above advantages, such pedal drive systems still require a significant power input from the user, albeit with their legs instead of their arms. As such, there remain instances where the typical pedal drive configuration is not ideal. For example, in high wind and/or high current conditions water pedaling can become difficult and exerting. As another example, pedaling for a long distance can be very exerting. To address the above, some pedal drive watercraft designs now incorporate some type of electro-mechanical device to supplement the pedaling force provided by the user.

For example, U.S. Pat. No. 9,988,133 to Murphy titled, "Integral Pedal Drive for a Watercraft" the teachings and disclosure of which are incorporated by reference in their entirety herein, discloses a pedal drive system that allows a user to pedal manually, or alternatively, for a motor to provide the power input that would otherwise be provided at the pedals. In other words, this system only allows for entirely manual power input or entirely motor power input.

As another example, U.S. Patent Application Publication No. 2012/0238159 to Palvoelgyi et al. titled, "Combination Manually Driven and Motor Driven Watercraft" the teachings and disclosure of which are incorporated by reference in their entirety herein, discloses a system wherein pedals and a motor can provide power inputs to provide thrust to the watercraft. However this system is relatively complex in that it requires the employment of multiple clutches as well as multiple clutch bypass mechanisms to achieve its functionality.

As yet another example, U.S. Pat. No. 7,549,902 to Jansen titled, "Electric Motor Assisted Propulsion System For Human-Powered Watercraft" the teachings and disclosure of which are incorporated by reference in their entirety herein, discloses a system wherein a motor is coupled to the mechanical pedal drive of the system, and the amount of assistance provided by the motor can be selected. However, the motor remains coupled to the system, and as such, creates additional pedaling resistance when the motor is not operational.

As such, there is a need in the art for a watercraft and associated pedal drive system that allows a user to pedal efficiently in calm and rough water, and over long distances. The invention provides such a watercraft and associated pedal drive system. These and other advantages of the invention, as well as additional inventive features, will be apparent from the description of the invention provided herein.

BRIEF SUMMARY OF THE INVENTION

In one aspect, the invention provides a watercraft offering a pedal drive system with pedal force assistance. An embodiment of such a watercraft includes a hull and a pedal drive system mounted to the hull. The pedal drive system includes a manual drive train including a pair of pedals and a drive shaft. The pair of pedals are mechanically coupled to the drive shaft such that rotation of the pedals about a pedal axis results in rotation of the drive shaft. The pedal drive system also includes a lower unit having a propeller. The lower unit is mechanically coupled to the drive shaft such that rotation of the pedals about the pedal axis results in rotation of the propeller. The pedal drive system also includes an assist drive train having an engaged position and a disengaged position. In the engaged position, a torque from a motor of the assist drive train is transferred to the manual drive train to supplement a manual pedal force input from a user operating the pair of pedals, and in the disengaged position, a portion of the assist drive train is mechanically coupled to the manual drive train and the motor is mechanically decoupled from the manual drive train.

In certain embodiments, the pedal drive system also includes a sensor arrangement for monitoring at least one operational parameter of the pedal drive system, and a controller in operable communication with the sensor arrangement to interpret information from the sensor arrangement regarding the at least one operational parameter. The controller is operably connected to the assist drive train to selectively transition the assist drive train from the disengaged position to the engaged position and from the engaged position to the disengaged position based upon a pedal state change indicated by a change in the at least one operational parameter.

In certain embodiments, the drive shaft includes a pinion gear, wherein the pinion gear is in meshed contact with an upper gear rotatable about the pedal axis.

In certain embodiments, the assist drive train includes a pinion gear, the pinion gear of the assist drive train in meshed contact with the upper gear.

In certain embodiments, the assist drive train includes a cam having a first member and a second member movable relative to the first member, a cam actuator for actuating the cam, and a clutch having a driving member and a driven member. The driving member is mounted to a splined output shaft of the motor of the assist drive train. The second member of the cam biases the driving member into contact with the driven member upon an actuating force the cam actuator upon the second member in a first direction such that a torque from the splined output shaft is transferred to the driven member.

In certain embodiments, a shaft extends from the driven member, and a pinion gear is mounted on the shaft. Rotation of the torque transferred to the driven member from the driving member is transferred to the pinion gear. In certain embodiments, an overrunning clutch is mounted within the driven member and received the shaft.

In certain embodiments, a biasing element is situated between the driving and driven members of the cam and biases the driving member out of contact with the driven member upon an actuating force from the cam actuator acting upon the second member in a second direction opposite the first direction such that a torque from the splined output shaft is not transferred to the driven member.

In certain embodiments, the sensor arrangement includes a speed sensor and a torque sensor. The speed sensor is arranged to monitor the revolutions per minute of an upper gear rotatable about the pedal axis. The torque sensor is arranged on a crank associated with one of the pair of pedals.

In another aspect, the invention provides a pedal drive system. An embodiment of such a pedal drive system includes a manual drive train including a pair of pedals, and a lower unit having a propeller. The lower unit is mechanically coupled to pair of pedals such that rotation of the pair of pedals about a pedal axis results in a thrust output at the lower unit. The pedal drive system also includes an assist drive train having an engaged position and a disengaged position. In the engaged position a torque from a motor of the assist drive train is transferred to the manual drive train. The pedal drive system also includes a sensor arrangement for monitoring at least one operational parameter of the pedal drive system and a controller in operable communication with the sensor arrangement to interpret information from the sensor arrangement regarding the at least one operational parameter. The controller is operably connected to the assist drive train to selectively transition the assist drive train from the disengaged position to the engaged position and from the engaged position to the disengaged position.

In certain embodiments, in the engaged position the torque from the motor of the assist drive train is transferred to the manual drive train to supplement a manual pedal force input from a user operating the pair of pedals, and in the disengaged position, a portion of the assist drive train is mechanically coupled to the manual drive train and the motor is mechanically decoupled from the manual drive train.

In certain embodiments, the at least one operational parameter includes pedaling speed or pedaling direction.

In yet another aspect, the invention provides a method of operating a pedal drive system of a watercraft. An embodiment of the pedal drive system includes a manual drive train having a pair of pedals, a lower unit for converting a manual pedal force input at the pedals to a thrust output at the lower unit, and an assist drive train for operable to produce a torque output for supplementing the manual pedal force input. An embodiment of the method includes transitioning the assist drive train from a disengaged position to an engaged position. In the engaged position, a torque from a motor of the assist drive train is transferred to the manual drive train, and wherein in the disengaged position that motor is mechanically decoupled from the manual drive train. The method also includes monitoring at least one operational parameter of the pedal drive system using a sensor arrangement and a controller and automatically transitioning the assist drive train from the engaged position to the disengaged position based upon a pedal state change indicated by a change in the at least one operational parameter.

In certain embodiments, the step of transitioning the assist drive train from the disengaged to the engaged position includes actuating a cam.

In certain embodiments, the step of transitioning the assist drive train from the disengaged to the engaged position includes actuating the cam to bias a driving member of a clutch into contact with a driven member of the clutch.

In certain embodiments, the step of actuating the cam includes actuating the cam using a solenoid.

In certain embodiments, the step of automatically transitioning the assist drive train from the engaged position to the disengaged position based upon the pedal state change indicated by a change in the at least one operational parameter includes transitioning the drive train from the engaged position to the disengaged position when the pedal state change includes a reduction of a pedaling speed to zero.

In certain embodiments, the step of automatically transitioning the assist drive train from the engaged position to the disengaged position based upon the pedal state change indicated by a change in the at least one operational parameter includes transitioning the drive train from the engaged position to the disengaged position when the pedal state change includes a detection that the pair of pedals are rotating in a reverse pedaling direction.

In certain embodiments, the method also includes a step of automatically reducing a torque output of the assist drive train when the pedal state change includes a reduction of a pedaling speed to a value less than a current pedaling speed.

In certain embodiments, the method also includes a step of providing electrical power from a power source to the motor simultaneously with actuating the cam.

In certain embodiments, the step of automatically transitioning the assist drive train from the engaged position to the disengaged position based upon the pedal state change indicated by the change in the at least one operational parameter includes ceasing electrical power from a power supply to the motor.

In certain embodiments, the method also includes monitoring at least one operational parameter of the pedal drive system using the sensor arrangement and the controller includes using a speed sensor.

In certain embodiments, monitoring the at least one operational parameter of the pedal drive system using the sensor arrangement and the controller includes using a torque sensor.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an exemplary embodiment of a watercraft 20 and an associated pedal drive system 22 constructed in accordance with the teachings herein. As will be explained in greater detail below, pedal drive system 22 allows for unassisted manual pedaling to provide thrust to watercraft 20. Pedal drive system 22 also provides on demand pedal assistance of varying levels via an assist drive train having an electric motor to supplement the manual pedal force input provided by a user at the pedals of pedal drive system 22. Advantageously, a majority of the assist drive train of pedal drive system 22 is disconnected from the remainder of the system when not providing any pedal assist force to minimize the amount of additional manual pedal force beyond that required by traditional pedal drive systems that do not include any type of assist functionality.

As mentioned above, pedal drive system 22 provides on demand pedal assist force of varying levels. In operation, the user turns the system on using a user interface described below. The user can select a level of assistance using this interface. Once the user begins pedaling forward, the assist drive train engages, and begins providing pedal assist force to ultimately reduce the amount of manual pedal force necessary for a given amount of thrust, while not changing the pedaling speed. Indeed, pedal drive system 22 utilizes an overrunning clutch to permit pedaling faster than the pedaling speed provided.

The system may be configured to monitor and change the amount of pedal assist force provided based on the manual pedal force provided by the user. For example, if the user's pedaling speed drops below a preset pedaling speed at a given level of assistance, the system can automatically reduce the amount of pedal assist force provided to match the new pedaling speed.

The system may also be configured to automatically disengage the assist drive train so as to stop providing pedal assist force if the user stops pedaling entirely. In such an instance, the user can then freely pedal backwards, without back-driving the entirety of the assist drive train of pedal drive system 22, for example to slow the forward motion of watercraft 20. If the user then resumes pedaling forward, the system may also automatically begin providing pedal assist force again by automatically detecting forward motion of the pedals, and then re-engaging the assist drive train. These and other functions of pedal drive system 22 are described in the following.

Figure 1:
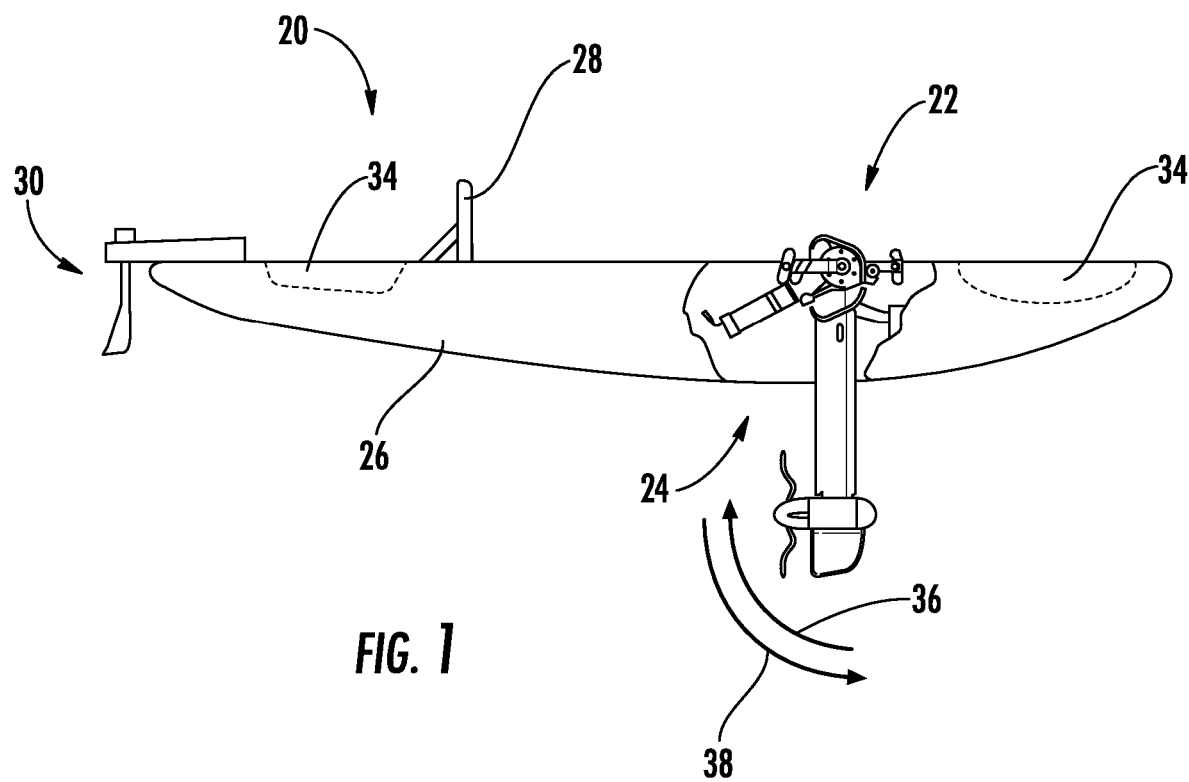
FIG. 1 is a side view of an exemplary embodiment of a watercraft with pedal assist constructed in accordance with the teachings of the invention.

With particular reference now to FIG. 1, watercraft 20 may take the form of any type of kayak or other similar watercraft. In the exemplary embodiment watercraft 20 can include an opening 24 in its hull 26 to allow a portion of pedal drive system 22 to extend below a bottom of hull 26 and provide thrust to watercraft that is converted from the manual pedal force and/or the pedal assist force provided by a user and/or pedal drive system 22. Indeed, a user (not shown) may be seated in seat 28 and operate pedal drive system 22 as well as any steering controls as mentioned in the following. Further, hull 26 may include one or more sealed or open top storage compartments 34.

Watercraft 20 can include a rudder system 30 and associated manual or automated controls to steer watercraft 20. The particular shape and size of watercraft 20 illustrated is purely exemplary and not limiting in any way on the invention herein. Further, the location, size, and shape of pedal drive system 22 relative to hull 26 is purely exemplary. It is envisioned that pedal drive system 22 may be incorporated into any watercraft where it may be desirable to include user pedal functionality.

Pedal drive system 22 may also be mounted to hull 26 such that it is movable generally in directions 36, 38 to selectively stow and deploy pedal drive system 22. To place pedal drive system 22 in a stowed position, pedal drive system 22 may be rotated in direction 36 such that it is generally stowed within opening 24 and does not extend downwardly through opening 24 as shown. To place pedal drive system 22 in a deployed position, the same may be rotated in direction 38 to place it generally in the illustrated configuration. Further, pedal drive system 22 may be rotated in direction 36 to completely remove it from hull 26. As such, appropriate seals and other structure may be employed so as to appropriately seal opening 24 when pedal drive system 22 is or is not present to reduce or eliminate the ingress of water into the interior of hull 26.

Figure 2:
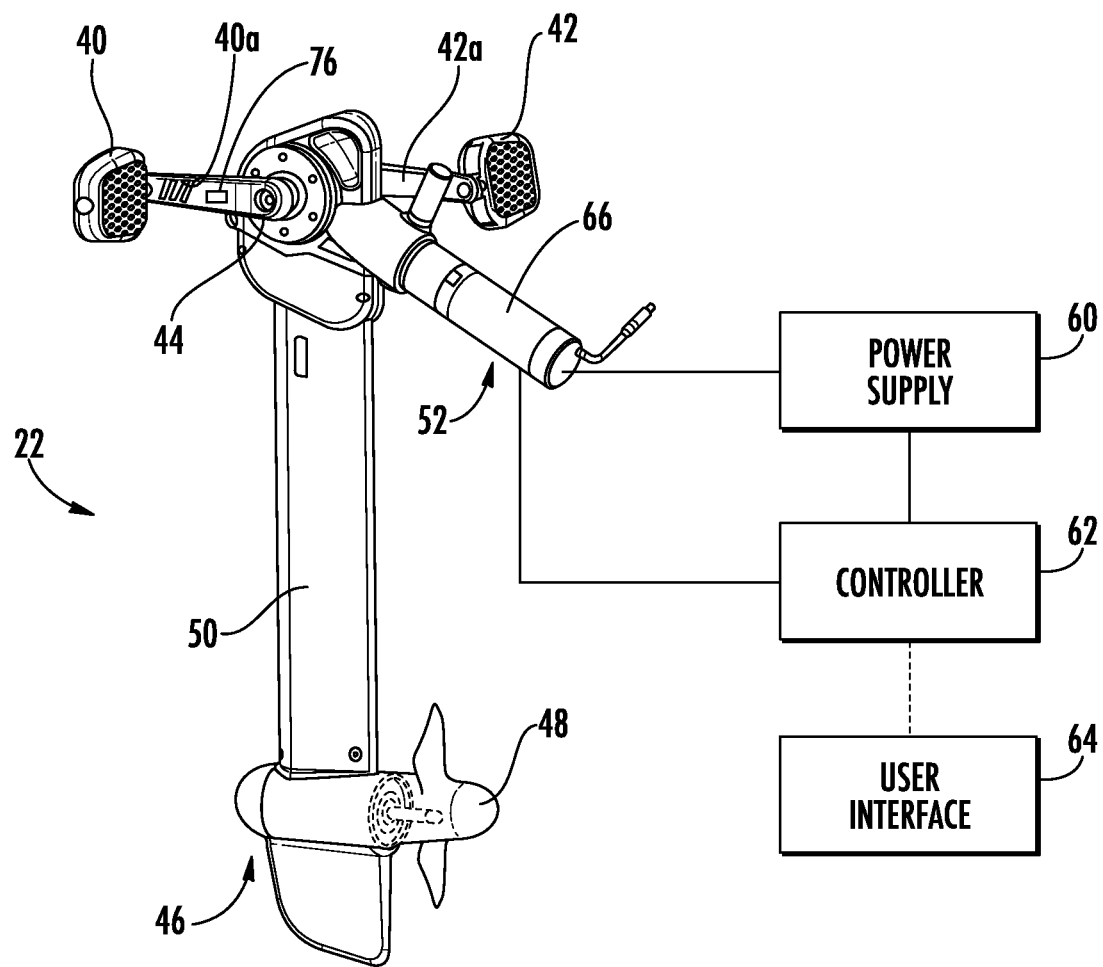
FIG. 2 is a perspective view of a pedal drive system of the watercraft of FIG. 1.

Turning now to FIG. 2, the same illustrates pedal drive system 22 unassociated with watercraft 20. Pedal drive system 22 includes a pair of pedals 40, 42 where a user can provide manual pedal force input. Each pedal includes an associated crank 40a, 42a, respectively, which are mounted to a rotatable shaft 44 defining a pedal axis extending longitudinally through shaft 44.

Figure 3:
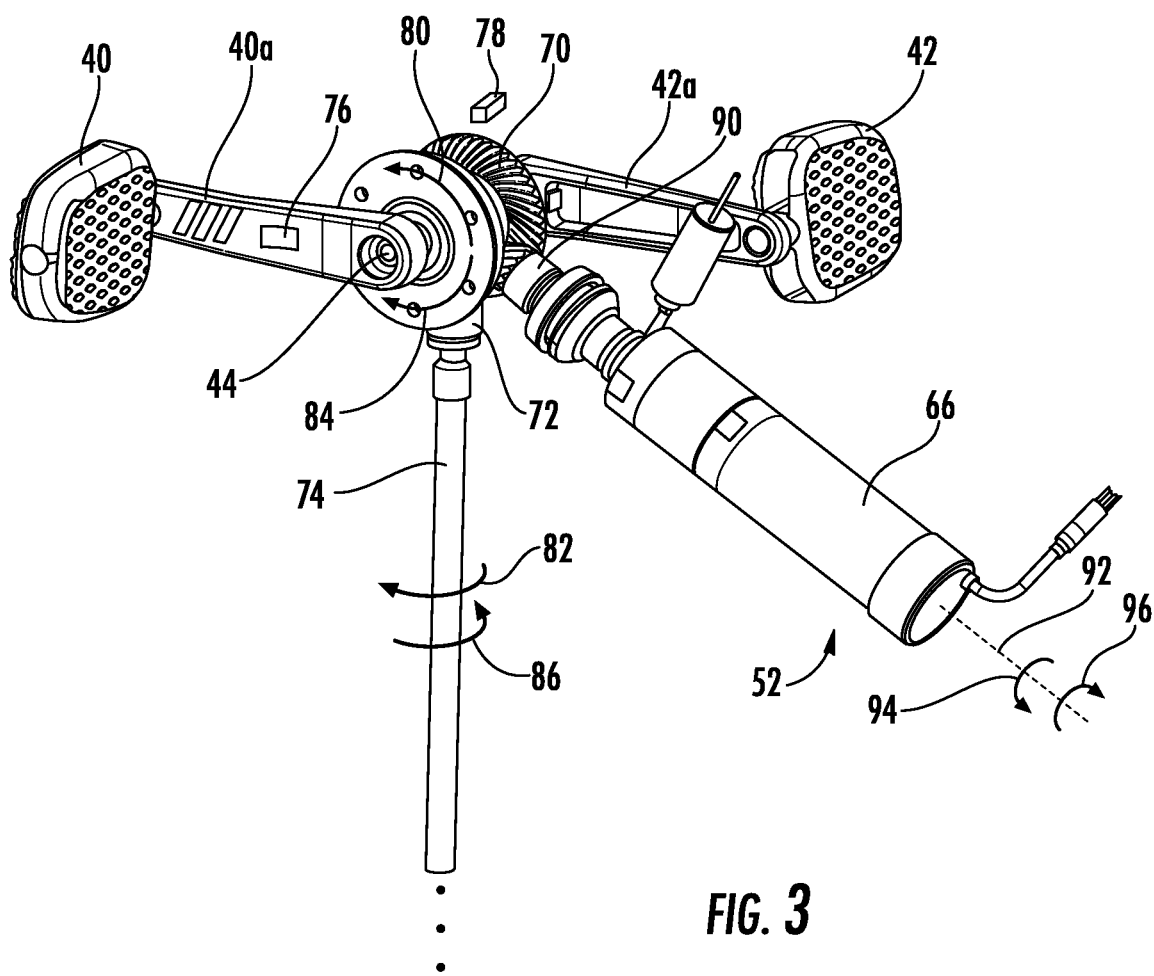
FIG. 3 is a partial perspective view of the pedal drive system of FIG. 2 with portions of its outer housing removed.

With momentary reference to FIG. 3, an upper gear 70 is also mounted to shaft 44 and is in meshed contact with a pinion gear 72 of a drive shaft 74 of pedal drive system 22. Drive shaft 74 is mechanically coupled to a lower unit 46 such that rotation of drive shaft 74 rotates a propeller 48 of lower unit 46 to ultimately provide thrust. The aforementioned componentry is primarily housed within a housing 50 of pedal drive system 22. The pedals 40a, 42a and drive shaft 74 are considered to thus constitute a manual drive train of pedal drive system 22, with the pedals 40a, 42a mechanically coupled to drive shaft 74 via upper gear 70. It will be recognized, however, that pedals 40a, 42a may be mechanically coupled to drive shaft 74 by any mechanical means that can convert the rotation about the pedal axis to rotation of drive shaft 74. For example, instead of employing a pinion gear arrangement as shown, spur gears with parallel shafts could be utilized. Ideally, a minimal number of mechanical components are utilized to minimize parasitic losses when assistance is not being provided.

Returning to FIG. 2, pedal drive system 22 also includes an assist drive train 52 for providing, via an electric motor, pedal assist force. A power supply 60 is associated with an electric motor 66 of assist drive train 52 and provides electrical power thereto. Power supply 60 may also provide power to a controller 62, the latter of which is utilized to monitor and control the operation of pedal drive system 22 based in part on inputs provided by a user interface 64. Power supply 60 may be any power source used in watercraft applications and, for non-limiting example, may be a marine battery.

Controller 62 may be a stand-alone controller housed within housing 50 or elsewhere on watercraft 20, and include all the necessary hardware, firmware, and software necessary for achieving the functionality described herein. Alternatively, controller 62 may be integrated into another device. For example, controller 62 may be integrated into a multi-function device e.g. a fish finder, a mobile device, or any other device readily available to the user which can receive inputs and send outputs. The term "integrated" in the foregoing includes not only combining the physical structure of controller 62 into such devices, but also includes embodying controller 62 entirely as a software program run on such devices. Indeed, many multi-function displays and mobile devices are fully capable of receiving inputs and sending outputs, and as such, it is entirely possible to utilize the existing hardware of such devices to operate as controller 62.

Controller 62 may communicate with pedal drive system 22 using a wired or wireless connection. In the case of a wireless connection, pedal drive system 22 can also include its own local hardware, software, and firmware necessary to communicate with such a remotely located controller 62 and respond to commands from controller 62. In addition to controlling the operation of the assist functionality of pedal drive system 22, controller 62 may also control other aspects of the system such as battery life and power consumption.

Further, controller 62 can receive inputs relating to the operation of pedal drive system 22, so as to control the assist functionality provided thereby. For example, a torque sensor 76 may be mounted to one or both of cranks 40a, 42a, and be in communication with controller 62. Alternatively, torque sensor 76 may be mounted to any structure of pedal drive system 22 where it can sense a torque loading. Additionally or in the alternative to torque sensor 76, a speed sensor 78 (see FIG. 4) may be associated with upper gear 70 to, for example, monitor the revolutions per minute thereof. This speed sensor 78 may also be in communication with controller 62. Sensors 76, 78 may communicated via a wired or wireless connection with controller 62, and allow controller 62 to detect pedal 40, 42 speed and direction.

The foregoing sensors 76, 78, however, are only several examples of many which could be used to monitor the operation of pedal drive system 22. All that is required is a sensor arrangement which is operable to detect one or more operational parameters of pedal drive system 22, for example pedaling speed and/or direction. As explained below, controller 62 utilizes such a sensor arrangement, which in the exemplary case includes sensors 76, 78, to look for a pedal state change (i.e. a change in pedaling speed or pedaling direction), to selectively transition assist drive train between engaged and disengaged positions and vice versa.

User interface 64 may be directly associated with controller 62. As one example, where controller 62 is integrated into a multi-function display or mobile device, user interface 64 may be presented on such devices using the existing interface capabilities thereof. As another example, where controller 62 is a stand-alone unit housed within housing 50, or located elsewhere in watercraft 20, the same can include its own user interface 64 thereon. Alternatively, user interface 64 may be a separate component such as a wired or wireless remotely controlled device. As another alternative, user interface 64 may be presented directly on pedal drive system 22 as a separate interface and communicate with controller 62. User interface 64 may utilize any contemporary interface features, e.g. touch screen controls, mechanical controls, motion controls, etc.

With reference to FIG. 3, the same illustrates a portion of pedal drive system 22 with housing 50 removed. As can be seen in this view, upper gear 70 is mounted on drive shaft 44 and rotates therewith as a result of the rotation of pedals 40, 42. Pinion gear 72 mounted on drive shaft 74 is in meshed contact with upper gear 70. As upper gear 70 rotates, so too does drive shaft 74 as a result of this meshed contact. Rotation of upper gear 70 in direction 80 results in rotation of drive shaft 74 in direction 82. Similarly, rotation of upper gear 70 in direction 82 results in rotation of drive shaft 74 in direction 86.

Assist drive train 52 is mechanically coupled to upper gear 70 via a pinion gear 90. As explained below, pinion gear 90 rotates about axis 92 in direction 94 to transfer an input torque produced by motor 66 to supplement the manual pedal force provided by a user at pedals 40, 42. As explained below, a majority of assist drive system 52 may be disengaged from pedal drive system 22 such that only a minimum amount of componentry (including pinion gear 90) rotates in direction 96 about axis 92 in the event pedals 40, 42 are pedaled backward, i.e. in direction 84. This reduces the additional resistance resulting from the presence of assist drive system 52 when not in use. Axis 92 and a longitudinal axis of drive shaft 74 are coplanar with one another, with axis 92 being transverse to the longitudinal axis of the drive shaft 74.

Whether or not any assistance is being provided via assist drive train 52, rotation of drive shaft 74 is converted at lower unit 46 to rotation of propeller 48 (see FIG. 2). Indeed, drive shaft 74 may be mechanically coupled to lower unit 46 by, for non-limiting example, a bevel gear set, a worm gear set, or any other mechanical connection used to transmit torque along multiple axes. This torque transmission rotates propeller 48 and provides thrust to watercraft 20.

Figure 4:
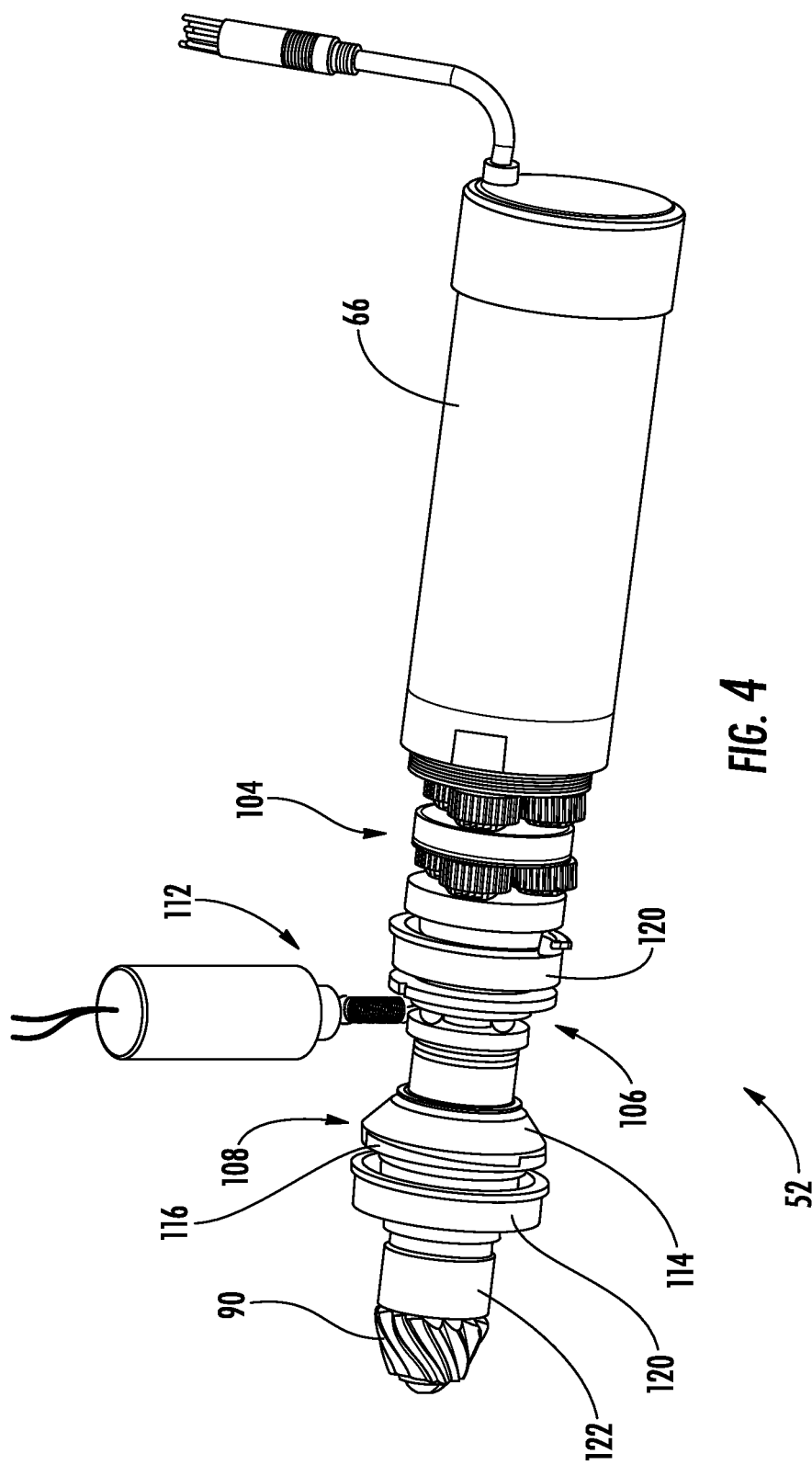
FIG. 4 is a perspective view of an assist drive train of the pedal drive system of FIG. 2.

Turning now to FIG. 4, the particulars of assist drive train 52 will be discussed in greater detail. Assist drive train 52 is illustrated isolated from the remainder of pedal drive system 22 for the purpose of illustration and discussion. Housing 50 is utilized to maintain assist drive train 52 in its orientation shown. Portions of the exterior coverings of assist drive train 52 are also illustrated removed for purposes of illustration and discussion.

Assist drive train 52 includes an electric motor 66 which is responsible for producing a pedal assist force in the form of a torque output at pinion gear 90. Electric motor 66 is a planetary gear motor in that it employs an integrated planetary gear set 104 at its output to achieve a desired output torque and speed range. The sizing of motor 66 and its planetary gear set 104 may be based on numerous factors, e.g. the size of watercraft 20 and the desired assistance range available from assist drive train 52. It is also contemplated that a direct drive motor could be used instead of a motor with an integrated planetary gear reducer as is shown.

Assist drive train 52 includes a cam 106 that is used to selectively engage and disengage a clutch 108. Cam 106 may be any type of cam used to produce an axial movement of a coupled component. In the illustrated embodiment, cam 106 is a rotary ball type cam. Clutch 108 is responsible for selectively coupling and decoupling pinion gear 90 from a remainder of assist drive train 52. When not coupled, i.e. when assist drive train 52 is disengaged, any output torque provided by motor 66 is not communicated to pinion gear 90, nor is torque from pinion gear 90 transmitted back to motor 66. When coupled, i.e. when assist drive train 52 is engaged, the torque output provided by motor 66 is communicated to pinion gear 90 through clutch 108.

Cam 106 is actuated by a cam actuator 112. Cam actuator 112 may for example be a solenoid type actuator assembly and controlled by controller 62 (FIG. 2). Cam 106 is operable to axially bias a driving member 114 of clutch 108 into contact with a driven member 116 of clutch 108. As discussed below, the output shaft of motor 66 is splined, and driving member 114 mates with this splined output shaft. As a result, driving member 114 may move axially relative to the output shaft of motor 66 but rotates with this output shaft.

Cam 106, clutch 108, and pinion 90 are axially aligned along axis 92 (FIG. 3) as shown. Further, one or more bearings 120 may be utilized to rotationally support the aforementioned componentry. Similarly, a bearing 122 may be employed to rotationally support pinion 90 within housing 50.

Figure 5:
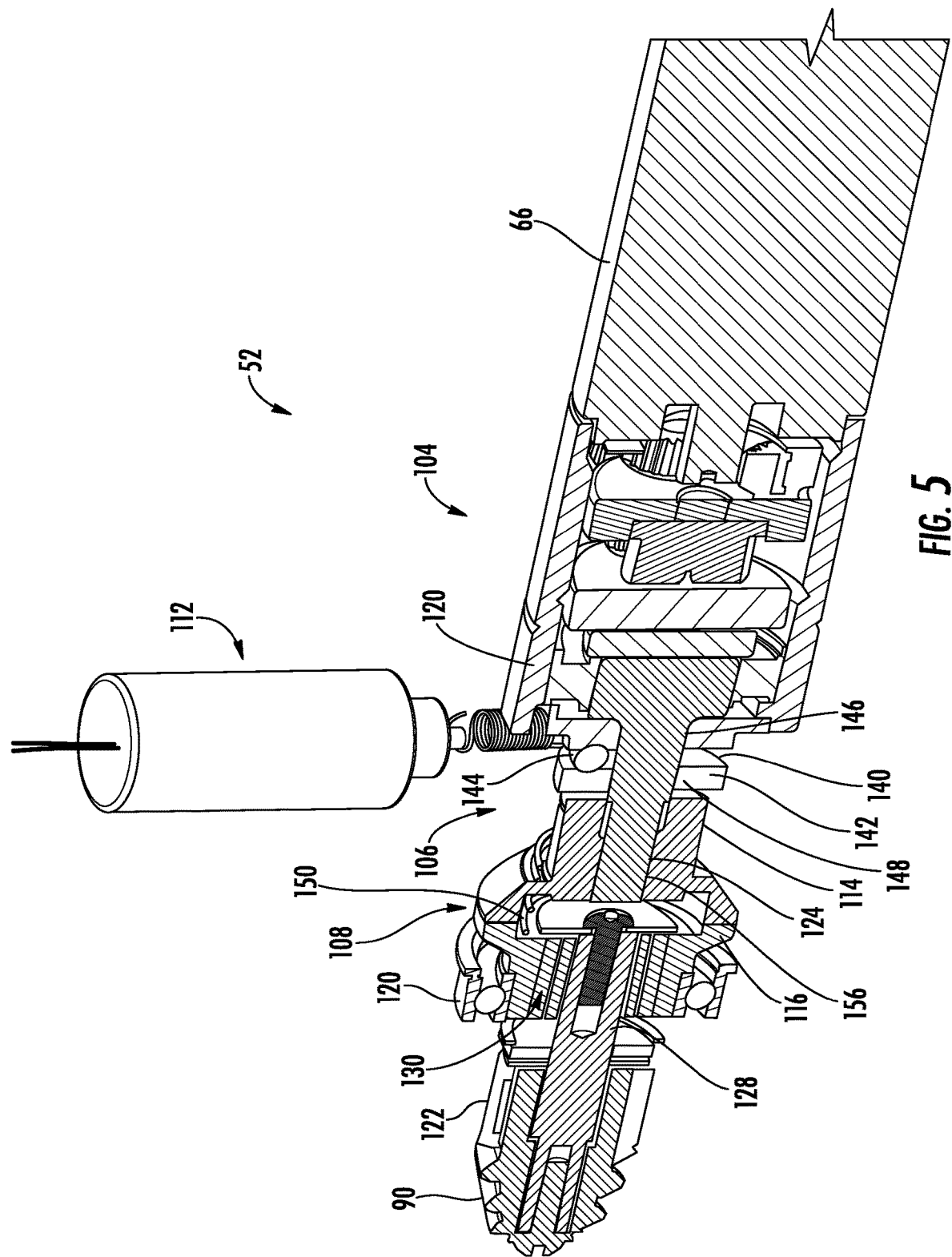
FIG. 5 is a partial cross section of the assist drive train of FIG. 4, shown in an engaged position.

Turning now to FIG. 5, the same illustrates a partial cross section of assist drive train 52. As can be seen in this view, the above introduced splined shaft 124 of motor 66 extends outwardly therefrom, particularly from planetary gear set 104. When clutch 108 is engaged as is shown in FIG. 5, rotation of shaft 124 causes a corresponding rotation of driving member 114 and driven member 116. A shaft 128 extends from driven member 116. Pinion 90 is mounted on shaft 128. Additionally, it is also contemplated that other types of clutches might be employed. For example, a friction clutch arrangement could be utilized which is actuated hydraulically, centrifugally, pneumatically, electromagnetically and/or via torque from a rotary spline. As another example, a rolling element or sprag type clutch could be utilized.

Rotation of shaft 128 results in a like rotation of pinion 90. However, an overrunning clutch 130 is mounted within driven member 116. Shaft 128 is coupled to this overrunning clutch 130 such that it is possible to rotate shaft 128 faster than the rotation imparted to shaft 128 by shaft 124. As explained above, pinion 90 is mounted to upper gear 70 (FIG. 3) and upper gear 70 rotates in part as a result of the manual pedal force input at pedals 40, 42 (FIG. 3). Overrunning clutch 130 allows a user to pedal faster, and hence cause pinion 90 to rotate faster, than the rotation of pinion 90 caused via the rotation of shaft 124 alone.

Cam 106 includes a first member 140 and a second member 142. Shaft 124 extends through respective openings 146, 148 of first and second members 140, 142. Second member 142 is rotatable about shaft 124 and is movable axially along shaft 124 relative to first member 140. A plurality of spherical members 144 are positioned between first and second members 140, 142. As discussed in the following, cam actuator 112 moves second member 142 such that it is displaced in the radial and axial directions relative to first member 140.

Axial displacement of second member 142 is caused by spherical members 144 and their positioning relative to first and second members as described below. This axial displacement biases driving member 114 into engagement with driven member 116, and against a counteracting biasing force provided by a biasing member 150 constrained between driving and driven members 114, 116. As a result, biasing member 150 is compressed as shown, and driving and driven members 114, 116 are brought into full engagement. As a result, assist drive train is in an engaged position, i.e. a position wherein the output torque at shaft 124 is transferred to pinion 90. Although not shown, a spring element could also be included between cam 106 and clutch 108 such that reverse pedaling, and hence reverse rotation of clutch 108, would not back drive motor 66.

Figure 6:
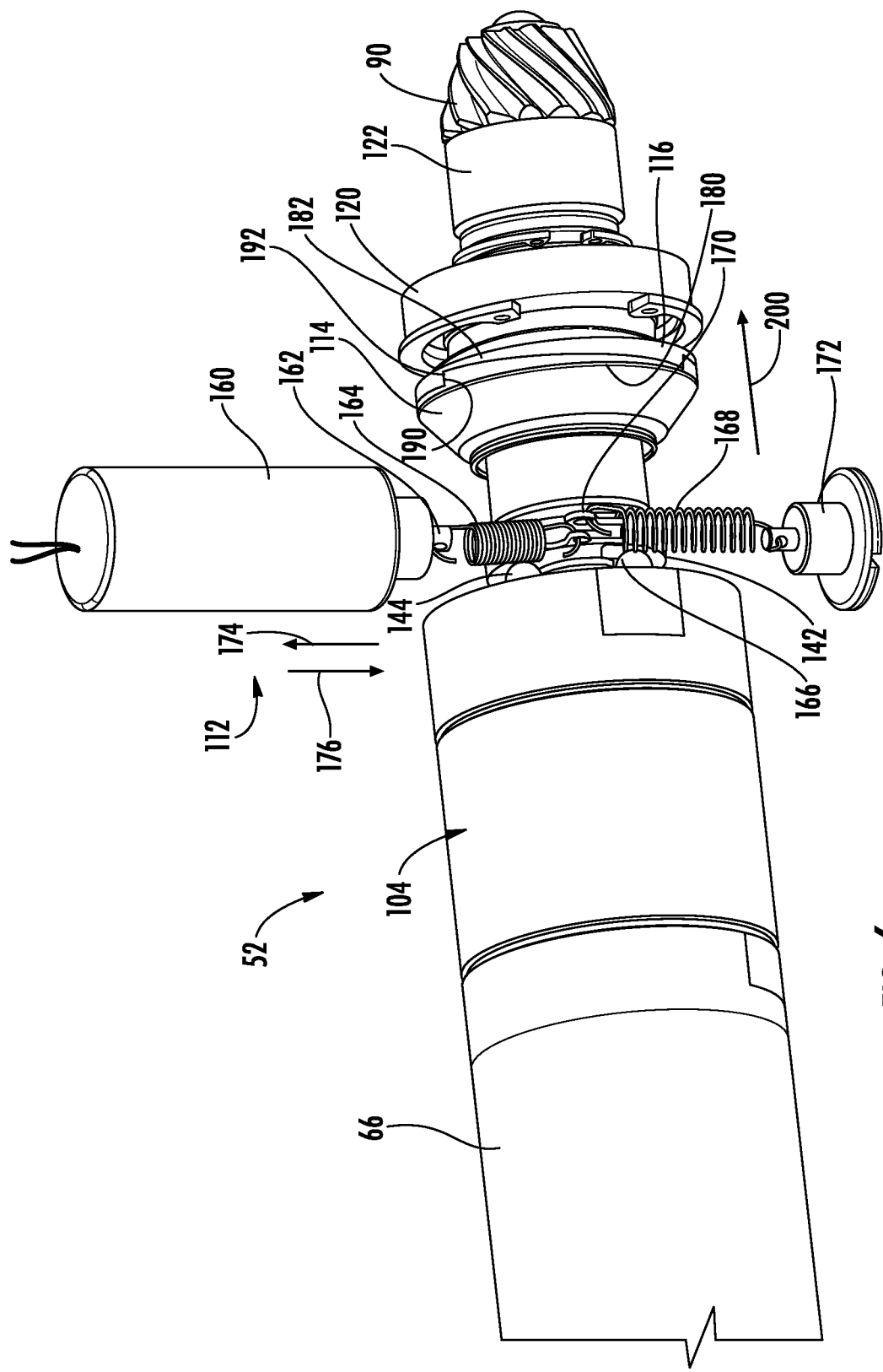
FIG. 6 is a partial perspective view of the assist drive train of FIG. 4, shown in the engaged position.

With reference to FIG. 6, cam actuator 112 includes a solenoid actuator 160 with a movable armature 162. A first spring 164 is attached at one end to armature 162 as shown and is attached at its other end to a retaining ring 166 of second member 142. Cam actuator 112 also includes a second spring 168 attached at one end to a retaining ring 170 of second member and is attached at its other end to a base member 172. Base member 172 and solenoid actuator 160 are constrained in place via housing 50 (FIG. 2). Movement of armature 162 in direction 174 applies a force to second member 142 via first spring 164 to rotate second member 142 about shaft 124 and into the position shown. This movement of second member 142 situates spherical members 144 as shown and causes second member 142 to move axially into the position shown in FIG. 6.

Driving member 114 is connected to second member 142 such that axial movement of second member 142 causes driving member 114 to move axially as well, and into engagement with driven member 116. Driving and driven members 114, 116 include corresponding ramped surfaces 180, 182, respectively, which are brought into abutment as shown. As shaft 124 (FIG. 5) rotates, so too will driving member 114 with its ramped surfaces 180 sliding along the ramped surfaces 182 of driven member 116. As this occurs, first spring 164 remains partially elongated as driving member 114 rotates.

Driving member 114 rotates relative to driven member 116 until shoulders 190, 192 are brought into abutment as is shown in FIG. 6. Further, prior to the abutment of shoulders 190, 192 as shown, and as ramped surfaces 180 slide along ramped surfaces 182, first spring 164 continues to apply a force in direction 174 to thereby cause second member 142 to continue to rotate which in turn causes second member 142 to move axially due to the repositioning of spherical members 144 as explained below.

The above described action transitions assist drive train 52 from its disengaged position, i.e. a position wherein an output torque of shaft 124 (FIG. 5) is not transferred to pinion 90, to its engaged position. It will also be noted that in the engaged position, second spring 168 is elongated and thus applies a force in direction 176 to second member 142. However, this force is not enough to counteract the force created by solenoid 160, first spring 164, and spherical members 144, causing second member 142 to move to the position shown in FIG. 6 by moving in direction 200. This in turn causes driving member 114 to also move in direction 200 as explained below. It is also contemplated that first and second springs 164, 168 could be integrated into solenoid 160 and act directly upon armature 162 to achieve the desired push/pull forces acting upon second member 142.

To transition assist drive train 52 from its engaged position to its disengaged position, solenoid 160 is de-energized and armature 162 is moved in direction 176. Further, rotation of shaft 124 (FIG. 5) is ceased. As this occurs, second spring 168 applies a force to second member 142 in direction 176, causing second member 142 to move such that spherical members 144 are repositioned between first and second members 140, 142, thereby allowing biasing member 150 (FIG. 5) to move driving member 114 out of contact with driven member 116, as explained in greater detail below relative to FIG. 8.

Figure 7:
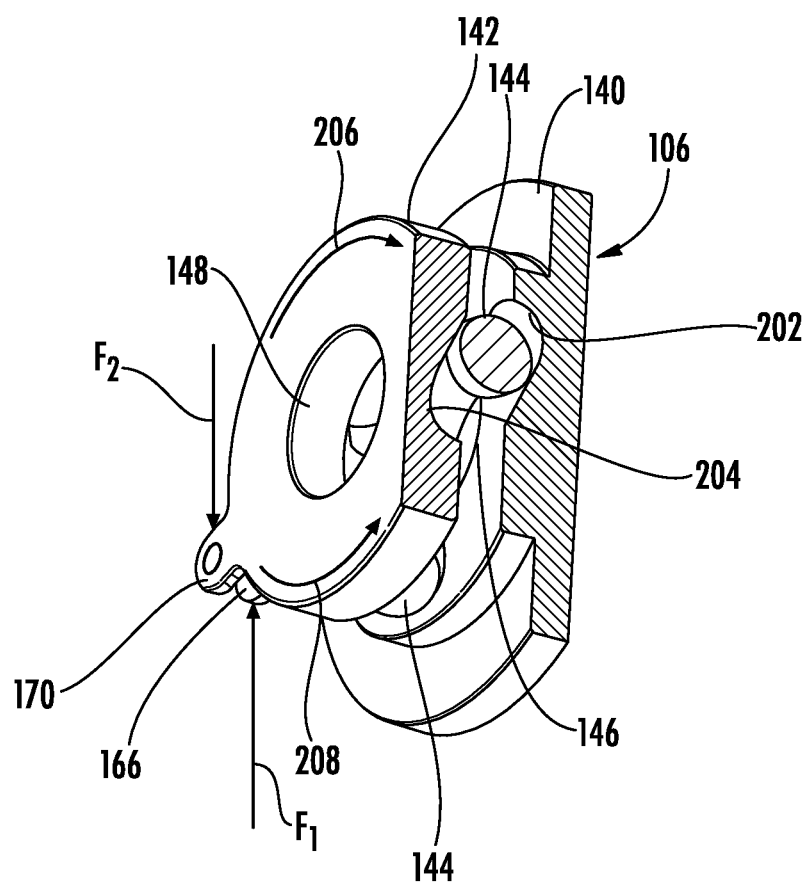
FIG. 7 is cross section of a rotary ball cam of the assist drive train of FIG. 4.

Turning now to FIG. 7, cam 106 is shown in a partial cross section and in an orientation corresponding to the engaged position of assist drive train 52 shown for example in FIGS. 5 and 6. In this configuration, first spring 164 has applied a force F1 to second member 142 which in turn causes second member 142 to rotate in direction 206. First and second members 140, 142 include ramped pockets 202, 204, respectively, which are aligned to constrain a spherical member 144. In the position shown in FIG. 7, ramped pocket 204 is aligned relative to ramped pocket 202 such that spherical member 144 is positioned to space second member 142 apart from first member 140.

In other words, spherical member 144 is positioned in the relatively shallower portions of ramped pockets 202, 204. Although this configuration is shown relative to one spherical member 144, it applies equally well to the remaining spherical members 144 and pockets 202, 204. This causes second member to move in direction 200 shown in FIG. 6, as well as driving member 114 given the connection of these components, to ultimately place assist drive train 52 in its engaged position.

However, when a force F2 is applied by second spring 168 to cause second member to rotate in direction 208, spherical members 144 will be positioned in the deeper portions of ramped pockets 202, 204, allowing second member 142 to move axially closer to first member 140, i.e. move in a direction opposite direction 200 shown in FIG. 6. This allows driving member 114 to also move in the same direction due to the biasing force provided by biasing member 150 (FIG. 5) to ultimately place assist drive train 52 in its disengaged position.

Figure 8:
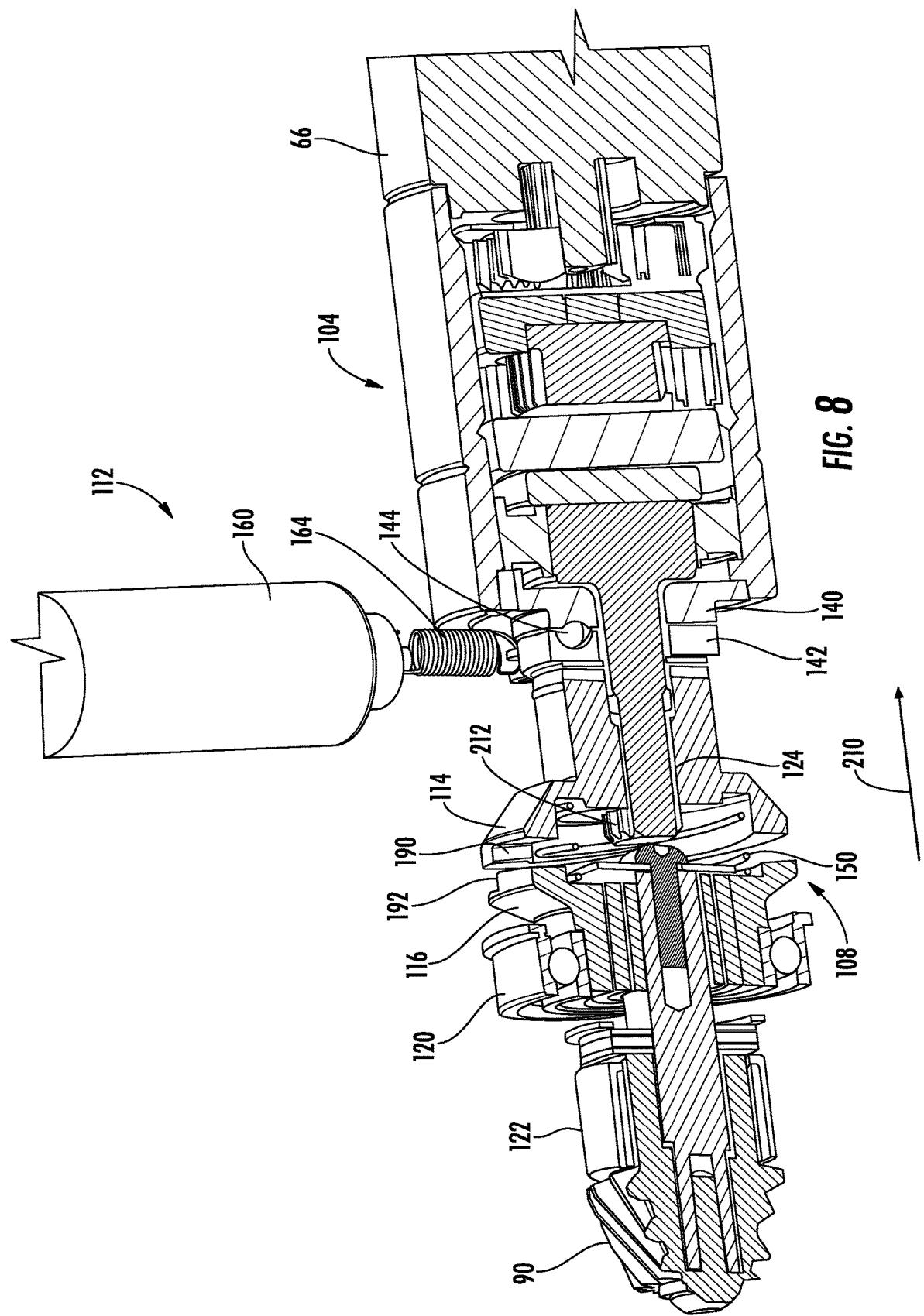
FIG. 8 is partial cross section of the assist drive train of FIG. 4, shown in a disengaged position.

With reference to FIG. 8, the same illustrates assist drive train 52 in cross section, and in the disengaged position. In this position, second member 142 has rotated relative to first member 140 such that spherical members 144 are positioned within the deeper portions of ramped portions 202, 204 (FIG. 7), thereby allowing second member 142 and driving member 114 to move along shaft 124 in direction 200 under the biasing force provided by biasing member 150. This action disengages clutch 108 such that any continued rotation of shaft 124 will rotate driving member 114, but such rotation will not be transferred to driven member 116, and hence shaft 128 and pinion 90.

As result, only minimum componentry of assist drive train 52 remains mechanically coupled to upper gear 70 (FIG. 3) such that the manual pedal force input requirement approaches that of a traditional pedal drive with no assist functionality. In other words, in this disengaged position, despite having a portion of assist drive train 52 which remains mechanically coupled to the manual drive train, motor 66 is mechanically decoupled from the manual drive train in that any rotation of shaft 124 does not result in rotation of drive shaft 74 (FIG. 3).

It is also contemplated that pedal drive system 22 could be configured to provide pedal assist force when pedaling backwards as well. Indeed, rather than disengaging assist drive train 52 when backwards pedaling is detected by controller 62 via the sensor arrangement monitoring pedal drive system 22 (e.g. sensors 76, 78), controller 62 could reverse the direction of rotation of shaft 124 from motor 66 by appropriately controlling motor 66. It will be recognized that such a configuration may include a motor configuration that allows for operation in both rotational directions for purposes of assisting in both forward and reverse.

It is also contemplated that a manual actuation arrangement for selectively engaging and disengaging assist drive train could also be employed. For example, a lever could be used to actuate cam in the same or similar manner as that done by solenoid 160. A switch or other sensor monitoring the lever could communicate whether the lever has been actuated to controller 62.

Figure 9:
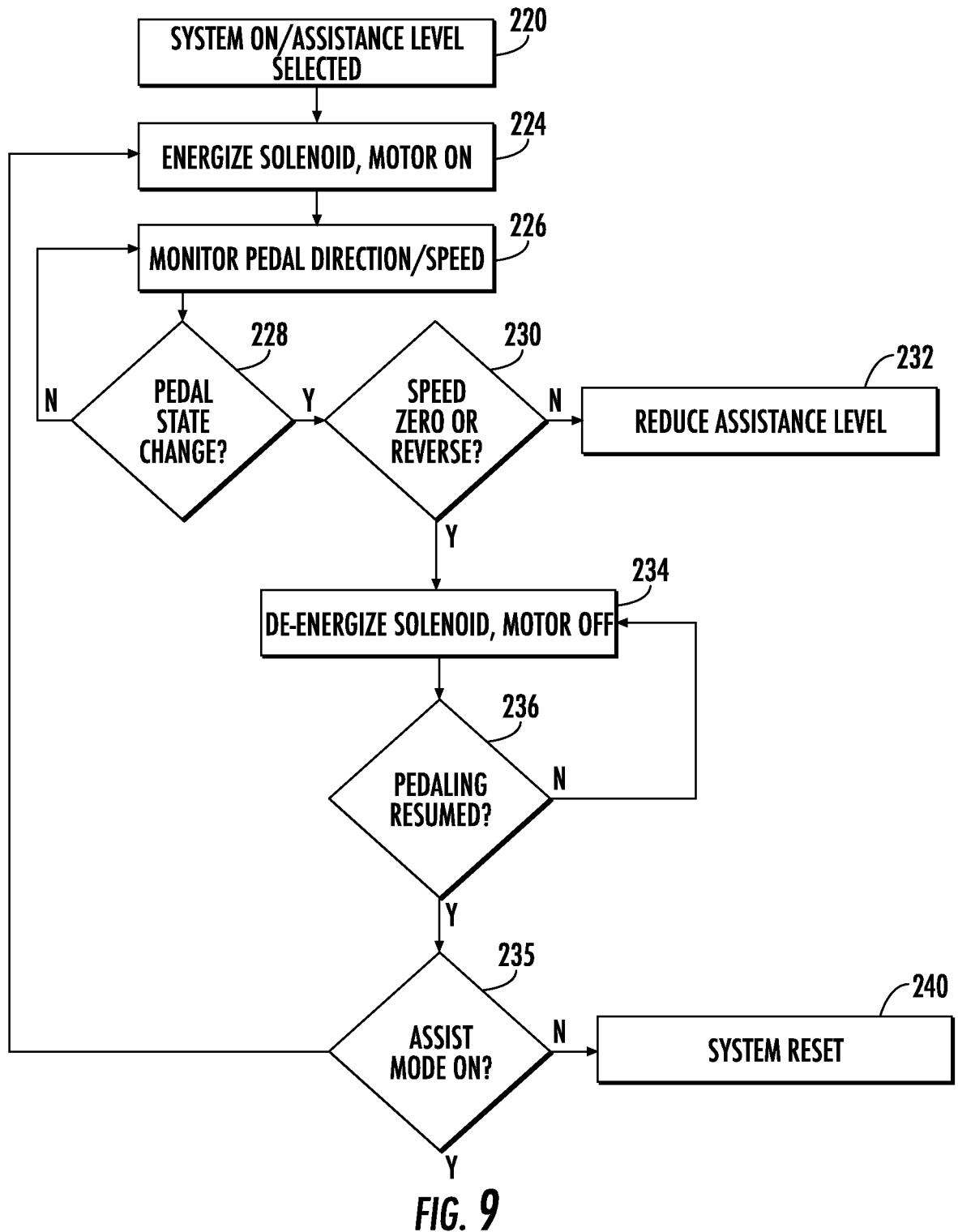
FIG. 9 is a schematic flow chart of one mode of operation of the pedal drive system.

Turning now to FIG. 9, having discussed the structural aspects of watercraft 20 and pedal drive system 22, a description will now be provided of an exemplary and general mode of operation of the foregoing. Reference is made to the structure illustrated in FIGS. 1-8. At step 220, a user, using user interface 64 turns on assist mode by powering the system on and selecting a level of assistance. This level of assistance may, for non-limiting example, range from low assistance, to moderate assistance, to high assistance.

At a low assistance setting, the amount of pedal assist force (i.e. the torque input provided at pinion 90 to assist in rotating upper gear 70) provided by assist drive train 52 may be relatively low, for example an amount which nearly simulates unassisted pedaling. Conversely, at a high assistance setting, the amount of pedal assist force provided by assist drive train 52 may be relatively higher, and significantly reduce the amount of manual pedal force input necessary to travel at a given speed in the water. The foregoing assistance levels and corresponding power inputs from power supply 60 to achieve same are saved in controller 62. Alternatively, it is also conceived that the system may be designed without any preset assistance levels and provide a fixed amount of assistance at all times.

Thereafter, at step 224, once the user begins pedaling, assist drive train 52 transitions to its engaged position by energizing solenoid 160 and providing power to motor 66. Once fully transitioned to the engaged position, a predefined amount of pedal assist force is thereafter provided as the user pedals. Simultaneously, controller 62 monitors pedal direction and pedal speed using sensors 76, 78. If controller 62 does not detect a pedal state change at step 228, i.e. a change in pedaling speed or pedaling direction, then controller 62 continues to monitor the same as step 226.

If, however, controller 62 does detect a pedal state change at step 228, the extent of the pedal state change is then observed at step 230. If the pedal state change is indicative of a user reducing pedaling speed, controller 62 will reduce the output of motor 66 provided at step 232 to match the user's new pedaling speed. In other words, controller 62 dynamically adjusts pedal drive system 22 to continue to provide the same amount of pedal assistance relative to the manual pedal force input provided by the user. When engaged, assist drive train 52 will follow the user's pedaling rate and is operable to increase or decrease the assistance provided. In embodiments that allow the user to set assistance at a preset speed, the over-running clutch allows for greater speed than that pre-set, with the proportional gradual loss of assist torque, or to allow operation in the forward direction even if the controller loses power due to a drained battery or other disabling condition. Further, controller 62 can be programmed to manage one or both of assist levels and speed. For example, the user can define a desired speed input, and assist drive train 52 will provide variable input as needed to maintain this speed, with a given level of assistance (which may be no assistance to complete assistance wherein the user need not provide manual force input). As another example, the user can define a desired assistance level, wherein the system always provides a set amount of assistance as the user pedals, and relative to the amount of force provided by the user. As mentioned above, assist drive train 52 employs an overrunning clutch 108 so that it will not be effected if a user increases pedaling speed. As such, controller 62 may be configured to only react to a reduction in pedaling speed. However, it also conceived that in embodiments not including an overrunning clutch 108, controller 62 could also increase the output of motor 66 to match the user's new pedaling speed, to continue to provide the same amount of pedal assist force relative to the manual pedal force input provided by the user.

If the detected pedal state change is indicative of the user stopping pedaling entirely as detected as step 230, then controller 62 will transition assist drive train 52 into its disengaged position by de-energizing solenoid 160 and ceasing the operation of motor 66 at step 232. As described above, this will decouple shaft 124 from pinion 90 via clutch 108 such that pinion 90 no longer provides an input to upper gear 70.

Additionally, controller 62 will also proceed to step 234 even if the extent of the pedal state change is indicative of the user pedaling backwards. In other words, after detecting an initial pedal state change at step 228, controller 62 will proceed from step 230 to step 234 in the event of zero pedal speed, i.e. the user has stopped pedaling entirely, or in the event of backwards pedaling. It is also noted that at any moment during its operation, controller will automatically proceed to step 234 in the event a user, using user interface 64, turns the system off.

Once assist drive train 52 is in its disengaged position at step 234, controller 62 then monitors for the user to resume pedaling at step 236. If pedaling is not resumed at step 236, then controller 62 remains at step 234. If, however, pedaling is resumed at step 236, controller 62 then verifies if the user still desires to have pedaling assistance provided, i.e. controller 62 verifies if the assist mode is still set to on at step 220. If yes, then controller 62 re-energizes solenoid 160 and provides power to motor 66 to transition assist drive train 52 from its disengaged position (see FIG. 8) to its engaged position (see FIG. 5). If no, then controller 62 proceeds to step 240 and remains off until a system on command is received at step 220.

The foregoing general description of the operation of pedal drive system 22 should be taken by way of example only. Indeed, as mentioned above, in alternative configurations the system may be configured to allow for pedal assist force when pedaling in reverse. It will be appreciated that various modifications to the operation shown in FIG. 9 may be undertaken to accommodate the various structural and functional attributes described herein.

While shown in the context of watercraft 20, it is also contemplated within the teachings herein that pedal drive system 22 may be provided as a stand-alone unit for subsequent association with a watercraft. Indeed, pedal drive system 22 may be provided to replace an existing pedal drive of an existing watercraft, or to add pedal drive functionality to a watercraft that does not otherwise include the same.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A watercraft, comprising:
    a hull;
    a pedal drive system mounted to the hull, the pedal drive system comprising:
    a manual drive train including a pair of pedals and a drive shaft, the pair of pedals mechanically coupled to the drive shaft such that rotation of the pedals about a pedal axis results in rotation of the drive shaft;
    a lower unit having a propeller, wherein the lower unit is mechanically coupled to the drive shaft such that rotation of the pedals about the pedal axis results in rotation of the propeller;
    an assist drive train having an engaged position and a disengaged position, wherein in the engaged position a torque from a motor of the assist drive train is transferred to the manual drive train to supplement a manual pedal force input from a user operating the pair of pedals, and wherein in the disengaged position, a portion of the assist drive train is mechanically coupled to the manual drive train and the motor is mechanically decoupled from the manual drive train; and
    a sensor arrangement for monitoring at least one operational parameter of the pedal drive system;
    a controller in operable communication with the sensor arrangement to interpret information from the sensor arrangement regarding the at least one operational parameter; and
    wherein the controller is operably connected to the assist drive train to selectively transition the assist drive train from the disengaged position to the engaged position and from the engaged position to the disengaged position based upon a pedal state change indicated by a change in the at least one operational parameter.

2. The watercraft of claim 1, wherein the sensor arrangement includes a speed sensor and a torque sensor.

3. The watercraft of claim 2, wherein the speed sensor is arranged to monitor the revolutions per minute of an upper gear rotatable about the pedal axis.

4. The watercraft of claim 2, wherein the torque sensor is arranged on a crank associated with one of the pair of pedals.

5. A pedal drive system for a watercraft, comprising:
a manual drive train comprising a pair of pedals;
a lower unit having a propeller, the lower unit mechanically coupled to the pair of pedals such that rotation of the pair of pedals about a pedal axis results in a thrust output at the lower unit;
an assist drive train, the assist drive train having an engaged position and a disengaged position, wherein in the engaged position a torque from a motor of the assist drive train is transferred to the manual drive train;
a sensor arrangement for monitoring at least one operational parameter of the pedal drive system;
a controller in operable communication with the sensor arrangement to interpret information from the sensor arrangement regarding the at least one operational parameter; and
wherein the controller is operably connected to the assist drive train to selectively transition the assist drive train from the disengaged position to the engaged position and from the engaged position to the disengaged position.

6. The pedal drive system of claim 5, wherein in the engaged position the torque from the motor of the assist drive train is transferred to the manual drive train to supplement a manual pedal force input from a user operating the pair of pedals, and wherein in the disengaged position, a portion of the assist drive train is mechanically coupled to the manual drive train and the motor is mechanically decoupled from the manual drive train.

7. The pedal drive system of claim 5, wherein the at least one operational parameter includes pedaling speed or pedaling direction.

8. The pedal drive system of claim 5, wherein the at least one operational parameter is a pedaling direction, the controller transitions the assist drive train from the engaged position to the disengaged position when the sensor arrangement senses that the pedaling direction is in a reverse direction that would drive the lower unit in a direction opposite a direction the assist drive train drives the lower unit.

9. The pedal drive system of claim 5, wherein:
the at least one operational parameter of the pedal drive system is pedaling of the manual drivetrain, and
the controller transitions the assist drive train from the disengaged position to the engaged position when the sensor arrangement senses that pedaling of the manual drivetrain has begun.

10. The pedal drive system of claim 5, wherein the controller is configured to control the assist drive train to provide at least two different levels of torque to the lower unit.

11. The pedal drive system of claim 10, further comprising a user interface operably communicating with the controller for switching between the at least two different levels.

12. The pedal drive system of claim 5, wherein the controller is configured to control the assist drive train to provide varying levels of torque to the lower unit; and
further comprising a user interface operably communicating with the controller for selecting a level of torque.

13. The pedal drive system of claim 5, wherein the controller is configured operate in a first mode in which the controller controls the assist drive train to provide all of the torque for generating the thrust provided by the lower unit.

14. The pedal drive system of claim 13, wherein, when in the first mode, the assist drive train remains in the engaged position even if no input force is provided by the manual drive train.

15. The pedal drive system of claim 5, wherein the controller is configured to maintain a desired speed or thrust even when no force input is provided by the manual drive train.

16. A watercraft, comprising:
a hull;
a pedal drive system of claim 5 mounted to the hull;
wherein:
the manual drive train includes a drive shaft, the pair of pedals mechanically coupled to the drive shaft such that rotation of the pedals about a pedal axis results in rotation of the drive shaft;
the lower unit is mechanically coupled to the drive shaft such that rotation of the pedals about the pedal axis results in rotation of the propeller to generate the thrust output;
in the disengaged position, a portion of the assist drive train is mechanically coupled to the manual drive train and the motor is mechanically decoupled from the manual drive train.

17. A method of operating a pedal drive system of a watercraft, the pedal drive system including a manual drive train, the manual drive train including a pair of pedals, a lower unit for converting a manual pedal force input at the pedals to a thrust output at the lower unit, and an assist drive train operable to produce a torque output for the lower unit, the method comprising:
transitioning the assist drive train from a disengaged position to an engaged position, wherein in the engaged position, a torque from a motor of the assist drive train is transferred to the manual drive train, and wherein in the disengaged position that motor is mechanically decoupled from the manual drive train;
monitoring at least one operational parameter of the pedal drive system using a sensor arrangement and a controller;
automatically transitioning the assist drive train from the engaged position to the disengaged position or from the disengaged position to the engaged position based upon a pedal state change indicated by a change in the at least one operational parameter.

18. The method of claim 17, wherein the step of transitioning the assist drive train from the disengaged to the engaged position includes actuating a cam.

19. The method of claim 18, wherein the step of transitioning the assist drive train from the disengaged to the engaged position includes actuating the cam to bias a driving member of a clutch into contact with a driven member of the clutch.

20. The method of claim 19, wherein the step of actuating the cam includes actuating the cam using a solenoid.

21. The method of claim 18, further comprising a step of providing electrical power from a power source to the motor simultaneously with actuating the cam.

22. The method of claim 17, wherein the step of automatically transitioning the assist drive train from the engaged position to the disengaged position based upon the pedal state change indicated by a change in the at least one operational parameter includes transitioning the drive train from the engaged position to the disengaged position when the pedal state change includes a reduction of a pedaling speed to zero.

23. The method of claim 17, wherein the step of automatically transitioning the assist drive train from the engaged position to the disengaged position based upon the pedal state change indicated by a change in the at least one operational parameter includes transitioning the drive train from the engaged position to the disengaged position when the pedal state change includes a detection that the pair of pedals are rotating in a reverse pedaling direction.

24. The method of claim 17, further comprising a step of automatically reducing a torque output of the assist drive train when the pedal state change includes a reduction of a pedaling speed to a value less than a current pedaling speed.

25. The method of claim 17, wherein the step of automatically transitioning the assist drive train from the engaged position to the disengaged position based upon the pedal state change indicated by the change in the at least one operational parameter includes ceasing electrical power from a power supply to the motor.

26. The method of claim 17, monitoring at least one operational parameter of the pedal drive system using the sensor arrangement and the controller includes using a speed sensor.

27. The method of claim 17, monitoring at least one operational parameter of the pedal drive system using the sensor arrangement and the controller includes using a torque sensor.

28. The method of claim 17, wherein the step of automatically transitioning the assist drive train from the disengaged position to the engaged position based upon the pedal state change indicated by a change in the at least one operational parameter includes transitioning the drive train from the disengaged position to the engaged position when the pedal state change includes a detection that pedaling has begun.

29. The method of claim 17, further comprising:
controlling the assist drive train to provide a first level of torque to the lower unit; and
controlling the assist drive train to provide a second level of torque to the lower unit.

30. The method of claim 17, further comprising operating the assist drive train while no manual force input is provided to the lower unit from the manual drive train such that all input to the lower unit is provided by the assist drive train.

31. The method of claim 17, further comprising operating the assist drive train while pedaling of the manual drive train is occurring such that the assist drive train supplements manual force input due to pedaling of the manual drive train.

* * * * *